(12) United States Patent
Linville et al.

(10) Patent No.: US 7,855,853 B2
(45) Date of Patent: Dec. 21, 2010

(54) MAGNETIC WRITE DEVICE WITH A CLADDED WRITE ASSIST ELEMENT

(75) Inventors: Eric S. Linville, Shakopee, MN (US); Mark T. Kief, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 808 days.

(21) Appl. No.: 11/820,689

(22) Filed: Jun. 20, 2007

(65) Prior Publication Data
US 2008/0316643 A1 Dec. 25, 2008

(51) Int. Cl.
*G11B 5/127* (2006.01)
(52) U.S. Cl. .................................................. 360/125.3
(58) Field of Classification Search ............... 360/125.3, 360/125.31, 125.71, 125.74
See application file for complete search history.

(56) References Cited

U.S. PATENT DOCUMENTS

| 4,268,584 A | 5/1981 | Ahn et al. |
|---|---|---|
| 4,319,264 A | 3/1982 | Gangulee et al. |
| 4,417,387 A | 11/1983 | Heslop |
| 4,970,574 A | 11/1990 | Tsunenari |
| 5,397,921 A | 3/1995 | Karnezos |
| 5,812,344 A | 9/1998 | Balakrishnan |
| 5,978,186 A | 11/1999 | Murata et al. |
| 6,030,877 A | 2/2000 | Lee et al. |
| 6,063,703 A | 5/2000 | Shinriki et al. |
| 6,683,002 B1 | 1/2004 | Chooi et al. |
| 6,812,141 B1 | 11/2004 | Gaidis et al. |
| 6,879,456 B2 | 4/2005 | Leighton et al. |
| 6,917,484 B2 | 7/2005 | Ranmuthu |
| 6,917,493 B2 | 7/2005 | Clinton et al. |
| 6,965,494 B2 * | 11/2005 | Campbell et al. ...... 360/125.04 |
| 6,972,916 B1 | 12/2005 | Aram et al. |
| 7,035,027 B2 | 4/2006 | Barnett et al. |
| 7,397,633 B2 | 7/2008 | Xue et al. |
| 7,724,469 B2 * | 5/2010 | Gao et al. ................. 360/125.3 |
| 2002/0092673 A1 | 7/2002 | Andricacos et al. |
| 2003/0156359 A1 | 8/2003 | Takahashi et al. |
| 2004/0108136 A1 | 6/2004 | Andricacos et al. |
| 2004/0169950 A1 | 9/2004 | Clinton et al. |
| 2004/0196581 A1 | 10/2004 | VanEaton et al. |
| 2005/0006777 A1 | 1/2005 | Andricacos et al. |
| 2005/0054191 A1 | 3/2005 | Yu et al. |
| 2005/0070097 A1 | 3/2005 | Barmak et al. |
| 2005/0174668 A1 | 8/2005 | Fang et al. |
| 2005/0280935 A1 * | 12/2005 | Clinton et al. ............... 360/125 |
| 2006/0198047 A1 | 9/2006 | Xue et al. |
| 2007/0297081 A1 | 12/2007 | Nazarov et al. |
| 2008/0112087 A1 * | 5/2008 | Clinton et al. ............... 360/317 |
| 2008/0117545 A1 * | 5/2008 | Batra et al. ............ 360/125.01 |
| 2008/0225435 A1 | 9/2008 | Hou et al. |
| 2008/0259493 A1 | 10/2008 | Kief et al. |
| 2008/0316631 A1 | 12/2008 | Gao et al. |

\* cited by examiner

*Primary Examiner*—Angel A. Castro
(74) *Attorney, Agent, or Firm*—Kinney & Lange, P.A.

(57) ABSTRACT

A magnetic device includes a write element having a write element tip and a conductor adjacent an edge of the write element tip for carrying current to generate an assist field that augments a write field generated by the write element. A cladding material is disposed on at least one surface of the conductor.

17 Claims, 6 Drawing Sheets

MAGNETIC WRITE DEVICE WITH A CLADDED WRITE ASSIST ELEMENT

BACKGROUND

The present invention relates to magnetic devices. More particularly, the present invention relates to a magnetic device that employs a current-carrying conductor to provide a magnetic field that assists a write field.

As magnetic recording storage densities continue to progress in an effort to increase the storage capacity of magnetic storage devices, magnetic transition (i.e., bit) dimensions and critical features of the recording device are being pushed below 100 nm. In addition, making the recording medium stable at higher areal densities requires magnetically harder (i.e., high coercivity) storage medium materials. A magnetically harder medium may be written to by increasing the saturation magnetization value of the magnetic material of the recording device to increase the magnetic field applied to the magnetic medium. However, the rate of increase of the saturation magnetization value is not sufficient to sustain the annual growth rate of bit areal densities.

Another approach to overcoming the coercivity of a magnetically hard medium is to provide a stronger write field by incorporating a write assist device adjacent to the tip of the write pole that produces a magnetic field to reduce the coercivity of the magnetic medium near the write pole. This allows data to be written to the high coercivity medium with a lower magnetic field from the write pole. In addition, the field gradient around the write pole tip is improved due to cancellation of stray fields from the write pole in regions that the assisting field opposes the write field. However, the regions in which the assist field opposes the write field are generally a distance from the write pole tip, and thus the gradient improvement is limited in the region in which transitions are written to the magnetic medium.

SUMMARY

The present invention relates to a magnetic device including a write element having a write element tip and a conductor adjacent an edge of the write element tip for carrying current to generate an assist field that augments a write field generated by the write element. A cladding material is disposed on at least one surface of the conductor.

DETAILED DESCRIPTION

Figure 1:
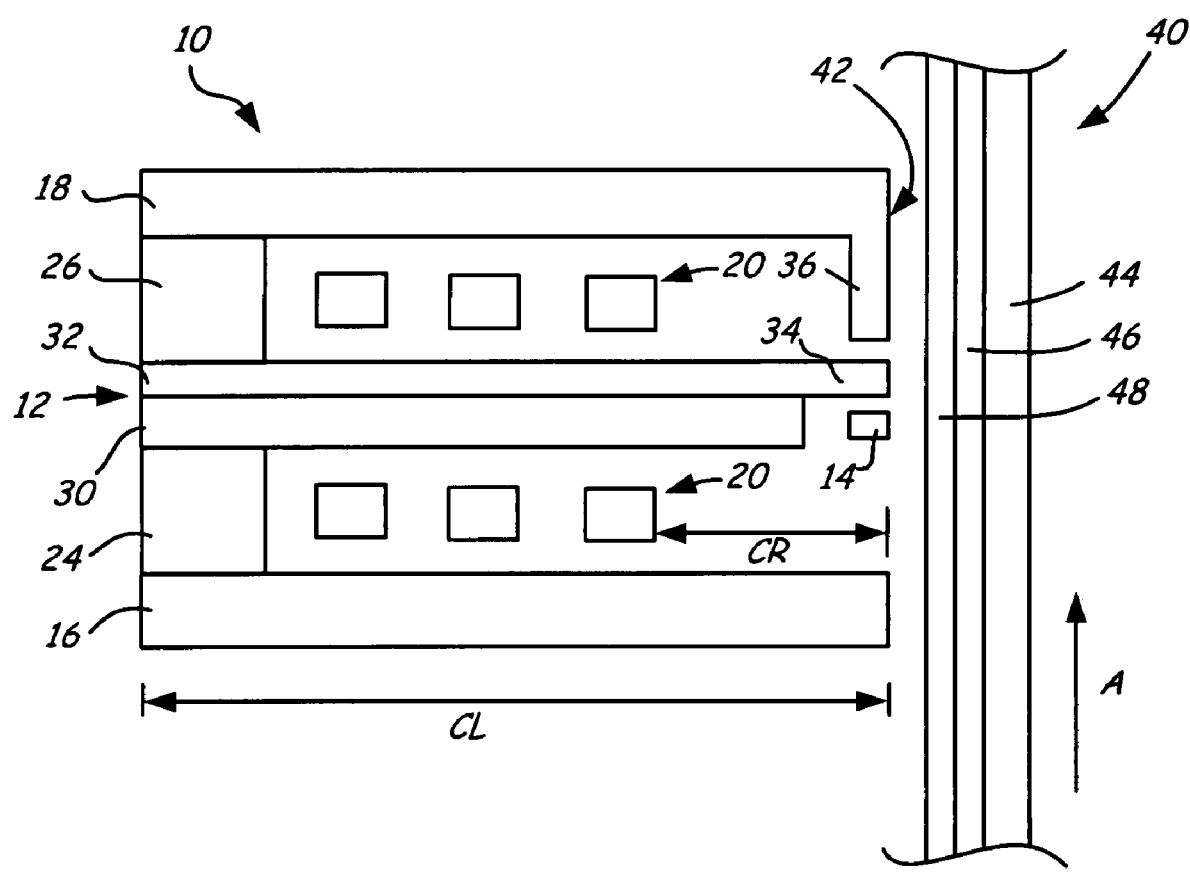
FIG. 1 is cross-section view of a magnetic writer including a trailing shield and a write assist conductor proximate a leading side of the write pole.

FIG. 1 is a cross-section view of magnetic writer 10, which includes write pole or element 12, current carrying conductor 14, first return pole or element 16, second return pole or element 18, and conductive coil 20. Write pole 12 is magnetically coupled to first return pole 16 by first magnetic stud 24, and to second return pole 18 by second magnetic stud 26. Conductive coil 20 surrounds write pole or element 12 such that portions of conductive coil 20 are disposed between write pole 12 and first return pole 16, and between write pole 12 and second return pole 18. Write pole 12 includes yoke 30 and write pole body 32 having write pole tip 34. Shield 36 extends from second return pole 18 toward write pole tip 34.

First return pole 16, second return pole 18, first magnetic stud 24, and second magnetic stud 26 may comprise soft magnetic materials, such as NiFe. Conductive coil 20 may comprise a material with low electrical resistance, such as Cu. Write pole body 32 may comprise a high moment soft magnetic material, such as CoFe, and yoke 34 and shield 36 may comprise a soft magnetic material, such as NiFe, to improve the efficiency of flux delivery to write pole body 32.

Magnetic writer 10 confronts magnetic medium 40 at medium confronting surface 42 defined by write pole tip 34, first return pole 16, and second return pole 18. Magnetic medium 40 includes substrate 44, soft underlayer (SUL) 46, and medium layer 48. SUL 46 is disposed between substrate 44 and medium layer 48. Magnetic medium 40 is positioned proximate to magnetic writer 10 such that the surface of medium layer 48 opposite SUL 46 faces write pole 12. Magnetic medium 40 is shown merely for purposes of illustration, and may be any type of medium usable in conjunction with magnetic writer 10, such as composite media, continuous/granular coupled (CGC) media, discrete track media, and bit-patterned media.

Magnetic writer 10 is carried over the surface of magnetic medium 40, which is moved relative to magnetic writer 10 as indicated by arrow A such that write pole 12 trails first return pole 16, leads second return pole 18, and is used to physically write data to magnetic medium 40. In order to write data to magnetic medium 40, a current is caused to flow through conductive coil 20. The magnetomotive force in conductive coil 20 causes magnetic flux to travel from write pole tip 34 perpendicularly through medium layer 48, across SUL 46, and through first return pole 16 and first magnetic stud 24 to provide a first closed magnetic flux path. The direction of the write field at the medium confronting surface of write pole tip 34, which is related to the state of the data written to magnetic medium 40, is controllable based on the direction that the first current flows through first conductive coil 20.

Stray magnetic fields from outside sources, such as a voice coil motor associated with actuation of magnetic writer 10 relative to magnetic medium 40, may enter SUL 46. Due to the closed magnetic path between write pole 12 and first return pole 16, these stray fields may be drawn into magnetic writer 10 by first return pole 16. In order to reduce or eliminate these stray fields, second return pole 18 is connected to write pole 12 via second magnetic stud 26 to provide a flux path for the stray magnetic fields. The stray fields enter first return pole 16, travels through first magnetic stud 24 and second magnetic stud 26, and exits magnetic writer 10 via second return pole 18.

Magnetic writer 10 is shown merely for purposes of illustrating an example construction that may be used in conjunction with the principles of the present invention, and variations on the design may be made. For example, while write pole 12 includes write pole body 32 and yoke 30, write pole 12 can also be comprised of a single layer of magnetic material. In addition, a single trailing return pole 18 may be provided instead of the shown dual return pole writer configuration. Furthermore, second return pole 18 may be removed and shield 36 may "float" proximate the trailing edge of write pole tip 34. These design variations are also applicable to any of the magnetic writer configurations described herein.

To write data to high coercivity medium layer 48, a stronger write field may be provided to impress magnetization reversal in the medium. To accomplish this, conductor 14 is provided proximate to magnetic medium 40 and the leading side of write pole tip 34. When a current is applied to conductor 14, an assist magnetic field is generated that augments the write field produced by write pole 12. The combination of the write field and the assist field generated by conductor 14 overcomes the high coercivity of medium layer 48 to permit controlled writing of data to magnetic medium 40. In addition, conductor 14 improves the write field gradient, which provides for a stronger write field proximate to write pole tip 34.

Conductor 14 may be formed from a portion of conductive coil 20 that extends proximate medium confronting surface 42, or conductor 14 may be a conductive wire formed separately from conductive coil 20. Conductor 14 may also have a cross-section that is smaller than that of conductive coil 20, as is shown. In addition, conductor 14 may be connected in series with conductive coil 20 such that the same current is supplied through conductive coil 20 and conductor 14. In this configuration, only one preamplifier is required, and the overall power consumption of magnetic writer 10 may be reduced. A circuit may also be provided in series with conductor 14 and conductive coil 20 such that the current waveform of the current through conductor 14 is ahead of or delayed with respect to the current waveform of the current through conductive coil 20. Conductor 14 may alternatively be connected in parallel with conductive coil 20 such that conductor 14 and conductive coil 20 are driven by separate preamplifiers from the same current source. Conductor 14 and conductive coil 20 may also be independently connected to separate current sources.

Shield 36 is included in magnetic writer 10 to improve the down-track write field gradient of magnetic flux from write pole 12. Magnetic flux through write pole 12 that is induced by current through conductive coil 22 passes through shield 36 parallel to magnetic medium 40. This reduces the perpendicular field component in the region between shield 36 and magnetic medium 40, providing most of the perpendicular component from magnetic writer 10 proximate to write pole 12. As a result, information recorded in medium layer 48 is subject to less destabilization in the down-track direction from magnetic writer 10.

Conductor 14 is disposed on a leading side of write pole tip 34. In some embodiments, conductor 14 is spaced less than about 100 nm from write pole tip 34. Conductor 14 may have a larger cross-section on the leading side of write pole tip than if on the trailing side of write pole tip 34, since the proximity of shield 36 to write pole tip 34 limits the available space on the trailing side of write pole tip 34. Consequently, the current density through conductor 14 is reduced relative to a trailing side conductor having a smaller cross-section, which reduces the power consumption of magnetic writer 10. In addition, when conductor 14 is disposed on the trailing side of write pole tip 34, the interaction between the magnetic fields generated by conductor 14 and the soft magnetic material of shield 36 may produce magnetic fields large enough to partially erase data stored in medium layer 48. By positioning conductor 14 on the leading side of write pole tip 34, this type of interaction is avoided.

Conductive coil 20 is recessed from medium confronting surface 42 by coil recess CR, and write pole 12 has a core length CL that extends from medium confronting surface 42 to magnetic studs 24 and 26. Coil recess CR and core length CL may be adjusted to provide variations in parameters related to the write field generated by magnetic writer 10. In some embodiments, coil recess CR and core length CL are minimized in light of stray field considerations to increase the peak field generated by magnetic writer 10 and/or reduce the rise time of the peak magnetic field when conductive coil 20 is energized. A reduction in rise time correlates to an increase in the data rate of magnetic writer 10.

To test the effect of adjusting coil recess CR, a 40 mA step coil current with a rise time of 0.25 ns was applied to magnetic writer 10, and coil recess CR was varied while keeping all other dimensions substantially the same. In magnetic writer 10 with coil recess CR of 5.0 µm and core length CL of 8.4 µm, the peak field was 11.3 kOe and the rise time (i.e., the time to transition from 0% to 90% of the peak field) was 0.6 ns. In magnetic writer 10 with coil recess CR of 1.0 µm and core length CL of 8.4 µm, the peak field was 11.6 kOe and the rise time was 0.4 ns. Thus, the coil recess CR may be reduced to improve the peak field and rise time of magnetic writer 10.

To test the effect of adjusting core length CL, a 40 mA step coil current with a rise time of 0.25 ns was applied to magnetic writer 10, and core length CL was varied while keeping all other dimensions substantially the same. In magnetic writer 10 with core length CL of 8.4 µm and a coil recess of 1.0 µm, the peak field was 12.3 kOe and the rise time was 0.41 ns. In magnetic writer 10 with core length CL of 4.8 µm and coil recess CR of 1.0 µm, the peak field was 12.3 kOe and the rise time was 0.39 ns. Thus, the core length CL may also be reduced to improve the rise time of magnetic writer 10.

Figure 2:
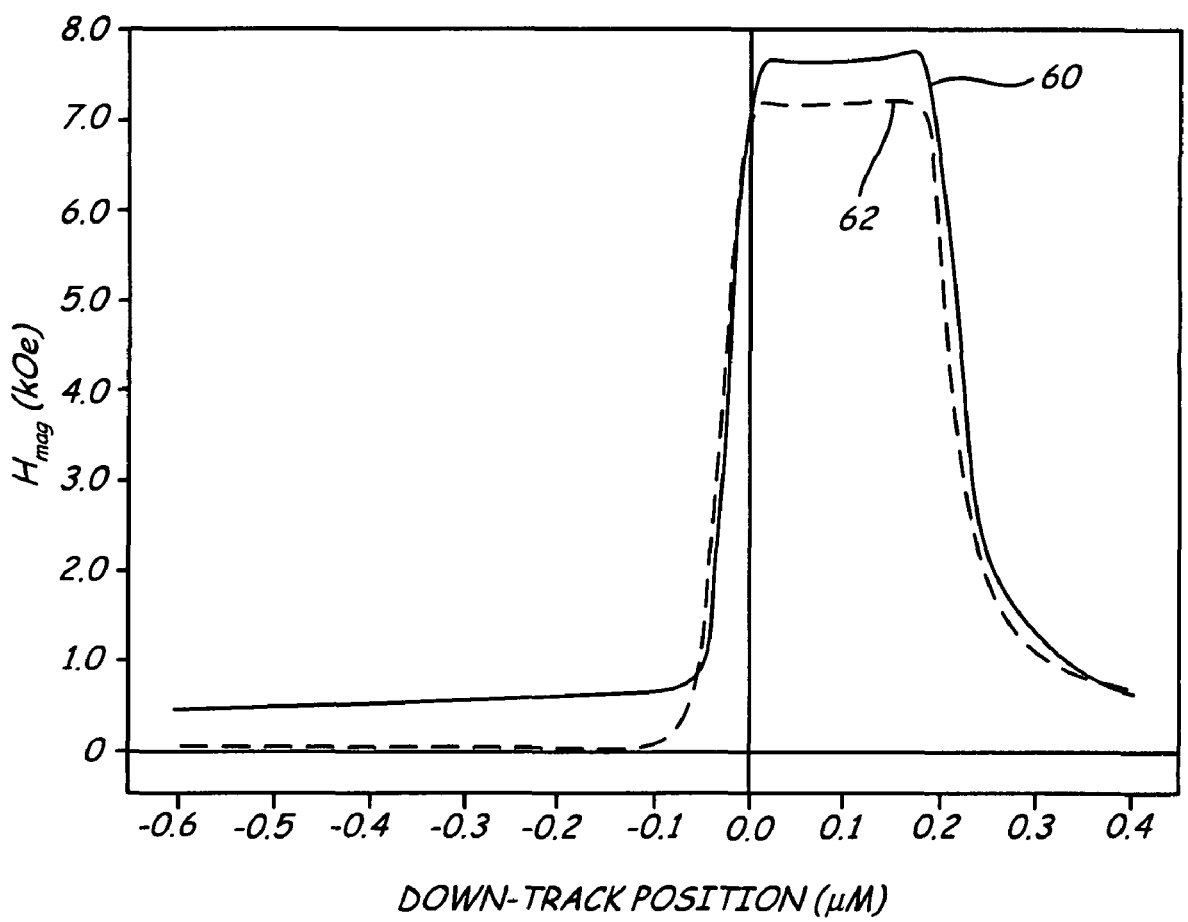
FIG. 2 is a graph of the perpendicular component of the net magnetic field as a function of the down-track position of the magnetic writer with and without the write-assist conductor.

FIG. 2 is a graph of the perpendicular component of the net magnetic field of magnetic writer 10 (write field from write pole 12 plus assist field from conductor 14) as a function of the down-track position. The net magnetic field at the leading edge of write pole tip 34 is plotted at position 0.0, with down-track positions in the positive direction moving toward the trailing edge of write pole tip 34. Line 60 shows the net magnetic field of magnetic writer 10 as shown in FIG. 1 including conductor 14 at the leading side of write pole tip 34, while line 62 shows the net magnetic field of magnetic writer 10 without conductor 14 at the leading edge. For line 60, conductor 14 was positioned about 50 nm from write pole tip 34, had cross-section dimensions of 200 nm by 200 nm, and was driven by a 10 mA current. As is shown, the net magnetic field from magnetic writer 10 increased by approximately 8% when conductor 14 was included at the leading edge of write pole tip 34, while maintaining a good field gradient.

Figure 3:
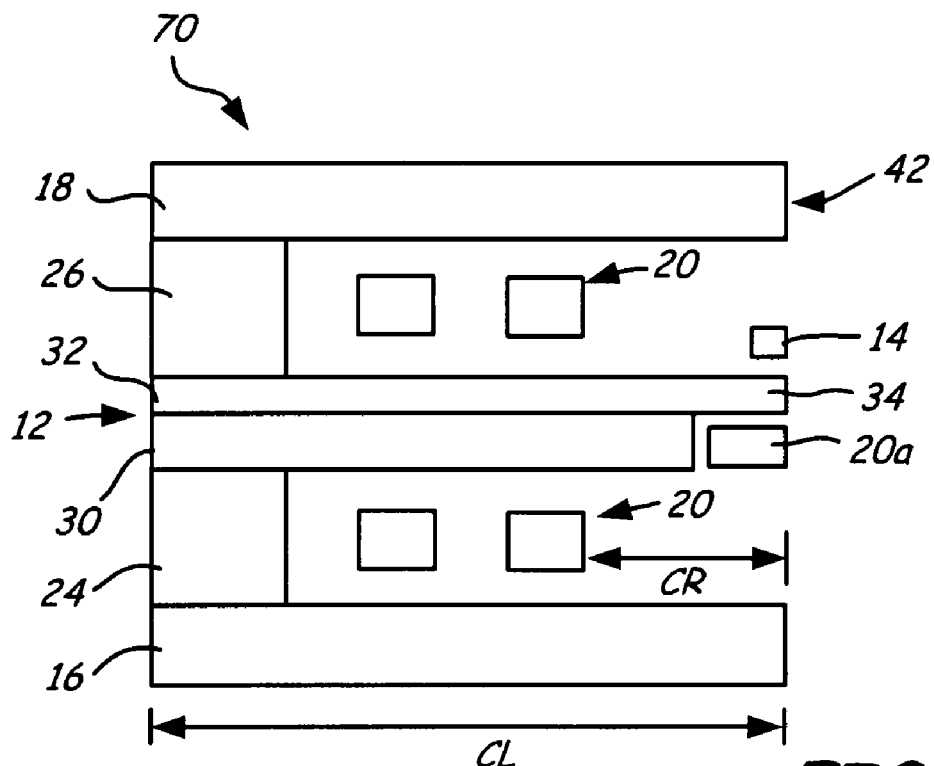
FIG. 3 is a cross-section view of a magnetic writer including a write assist conductor proximate the trailing side of the write pole and a conductive coil portion proximate the leading side of the write pole.

Other parameters related to magnetic writer 10 may also be varied to improve the efficiency of magnetic writer 10. For example, FIG. 3 is a cross-section view of magnetic writer 70 including conductor 14 proximate the trailing side of the write pole and a portion 20a of conductive coil 20 proximate the leading side of write pole tip 34. In this embodiment, conductive coil 20 includes two turns that surround write pole 12. By reducing the number of turns in conductive coil 20, the efficiency of magnetic writer 70 is improved and the power consumed by magnetic writer 70 is reduced. In addition, core length CL and coil recess CR of magnetic writer 70 is reduced compared to magnetic writer 10 to improve the rise time and peak field generated. By reducing core length CL, coil recess CR, and the number of turns of conductive coil 20 around write pole 12, the amount of flux leakage and side track erasure from magnetic writer 70 is also reduced.

Conductive coil portion 20a is a quarter turn of conductive coil 20 disposed proximate medium confronting surface 42. Conductive coil portion 20a may have a cross-section that is substantially equal to or larger than the cross-section of conductor 14. In addition, the cross-section of conductive coil portion 20a may be substantially equal to or smaller than the cross-section of the remainder of conductive coil 20. Conductor 14 may be connected in series or in parallel with conductive coil 20 and conductive coil portion 20a. Conductor 14 may alternatively be another quarter turn of conductive coil 20 disposed on the leading side of write pole tip 34.

When conductive coil 20 and conductive coil portion 20a are driven by a current, the magnetomotive force in conductive coil 20 induces the magnetic flux from write pole tip 34 to produce the write field. A magnetic field is also generated by conductive coil portion 20a that augments the write field produced by write pole 12. Furthermore, conductor 14 is provided proximate magnetic medium 40 at the trailing side of write pole tip 34. When a current is applied to conductor 14, an assist magnetic field is generated that further augments the write field produced by write pole 12. The combination of the write field, the field generated by conductive coil portion 20a, and the assist field generated by conductor 14 provides an increase in the net field at magnetic medium 40 (FIG. 1) to overcome the high coercivity of medium layer 48 and permit controlled writing of data to magnetic medium 40. Because the net field generated by magnetic writer 70 is increased with the inclusion of conductive coil portion 20a, the efficiency of magnetic writer 70 is improved, which allows for a reduction in the current applied to conductive coil 20.

Figure 4:
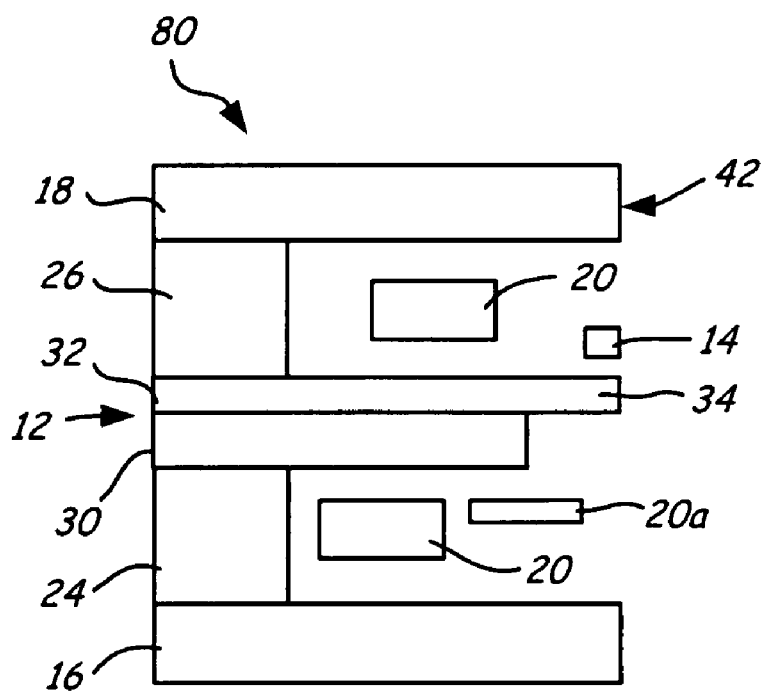
FIG. 4 is a cross-section view of a magnetic writer including a write assist conductor proximate the trailing side of the write pole and a recessed conductive coil portion proximate the leading side of the write pole.

FIGS. 4-7 show various other representative magnetic writer configurations that provide improved efficiency, reduced power consumption, improved rise time and peak field, and/or reduced flux leakage and side track erasure. FIG. 4 is a cross-section view of magnetic writer 80 including conductor 14 proximate the trailing side of write pole tip 34 and conductive coil portion 20a proximate the leading side of write pole tip 34. In this embodiment, conductive coil 20 includes a single turn that surrounds write pole 12. A smaller number of turns in conductive coil 20 improves the efficiency of magnetic writer 80, and the power consumed by magnetic writer 80 is reduced. In addition, the rise time and peak field generated by magnetic writer 80 is improved due to a smaller core length and coil recess. By reducing the core length, the coil recess, and the number of turns of conductive coil 20 around write pole 12, the amount of flux leakage and side track erasure from magnetic writer 80 is also reduced.

The cross-section of conductive coil 20 is increased to allow for the application of a larger write current and reduce the stray fields from conductive coil 20. In addition, half-turns of conductive coil 20 are offset with respect to each other relative to the longitudinal dimension of write pole 12 to adjust the flux profile in write pole 12. Conductive coil portion 20a is recessed from medium confronting surface 42 and has a cross-section smaller than the remainder of conductive coil 20 and larger than conductor 14 to provide a controllable field from conductive coil portion 20a at magnetic medium 40. Conductive coil portion 20a is also disposed a distance from the leading edge of write pole tip 34 to permit fields from conductive coil portion 20a to be focused by yoke 30.

Figure 5:
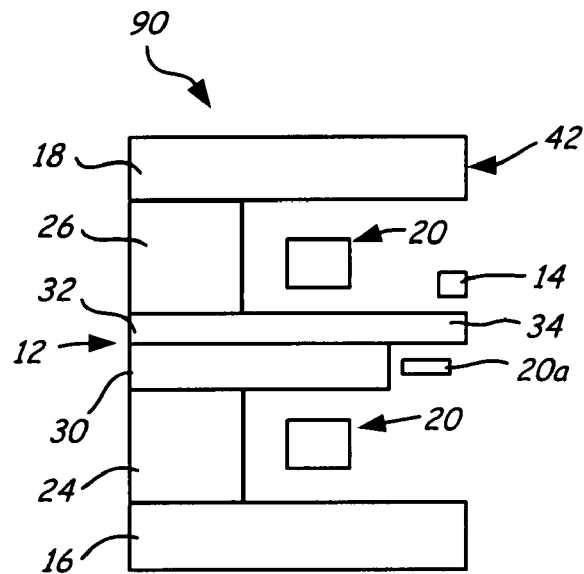
FIG. 5 is a cross-section view of a magnetic writer including a write assist conductor proximate the trailing side of the write pole, a conductive coil portion proximate the leading side of the write pole, and a single turn of conductive coil around the write pole.

FIG. 5 is a cross-section view of magnetic writer 90 including conductor 14 proximate the trailing side of write pole tip 34 and conductive coil portion 20a adjacent the leading side of write pole tip 34. In this embodiment, conductive coil 20 includes a single turn that surrounds write pole 12 such that half-turns of conductive coil 20 are symmetrically disposed with respect to the longitudinal dimension of write pole 12. A smaller number of turns in conductive coil 20 improves the efficiency of magnetic writer 90, and the power consumed by magnetic writer 90 is reduced. In addition, the rise time and peak field generated by magnetic writer 90 is improved due to a smaller core length and coil recess. By reducing the core length, the coil recess, and the number of turns of conductive coil 20 around write pole 12, the amount of flux leakage and side track erasure from magnetic writer 90 is also reduced.

Conductive coil portion 20a is recessed from medium confronting surface 42 and has a cross-section smaller than the remainder of conductive coil 20 to provide a controllable field from conductive coil portion 20a at magnetic medium 40. Conductive coil portion 20a is disposed proximate medium confronting surface 42 to maximize the net field strength at magnetic medium 40.

Figure 6:
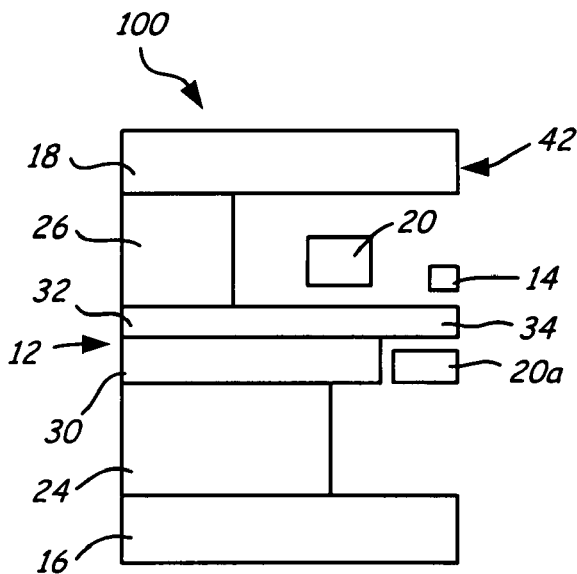
FIG. 6 is a cross-section view of a magnetic writer including a write assist conductor proximate the trailing side of the write pole, a conductive coil portion proximate the leading side of the write pole, and a half turn of conductive coil around the write pole.

FIG. 6 is a cross-section view of magnetic writer 100 including conductor 14 proximate the trailing side of write pole tip 34 and conductive coil portion 20a adjacent the leading side of write pole tip 34. In this embodiment, conductive coil 20 includes a half-turn around write pole 12. A smaller number of turns in conductive coil 20 improves the efficiency of magnetic writer 100, and the power consumed by magnetic writer 100 is reduced. In addition, the rise time and peak field generated by magnetic writer 100 is improved due to a smaller core length and coil recess. By reducing the core length, the coil recess, and the number of turns of conductive coil 20 around write pole 12, the amount of flux leakage and side track erasure from magnetic writer 100 is also reduced.

First magnetic stud 24 is extended to be more proximate medium confronting surface 42 than second magnetic stud 26 to provide a larger feature to receive stray fields from outside sources. Conductive coil portion 20a is positioned between yoke 30 and medium confronting surface 42 to maximize the net field strength at magnetic medium 40. Conductive coil portion 20a has a cross-section smaller than the remainder of conductive coil 20 and larger than conductor 14 to provide a controllable field from conductive coil portion 20a at magnetic medium 40.

Figure 7:
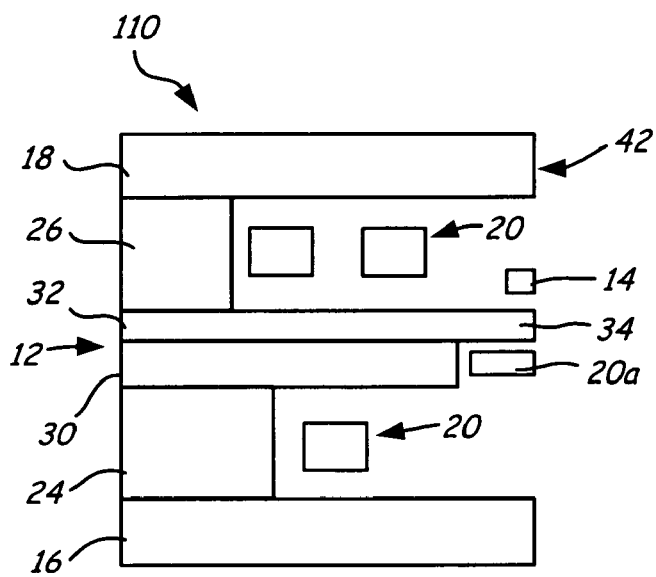
FIG. 7 is a cross-section view of a magnetic writer including a write assist conductor proximate the trailing side of the write pole, a conductive coil portion proximate the leading side of the write pole, and one and a half turns of conductive coil around the write pole.

FIG. 7 is a cross-section view of magnetic writer 110 including conductor 14 proximate the trailing side of write pole tip 34 and conductive coil portion 20a adjacent the leading side of write pole tip 34. In this embodiment, conductive coil 20 includes a one and a half turns that surround write pole 12. This allows for a larger amount flux developed in write pole 12 compared to the embodiments shown in FIGS. 4-6 due to the larger number of turns surrounding write pole 12. At the same time, compared to the embodiments shown in FIGS. 1 and 3, the smaller number of turns in conductive coil 20 improves the efficiency of magnetic writer 110 and the power consumed by magnetic writer 110 is reduced. In addition, the rise time and peak field generated by magnetic writer 110 is improved due to a smaller core length and coil recess. By reducing the core length, the coil recess, and the number of turns of conductive coil 20 around write pole 12, the amount of flux leakage and side track erasure from magnetic writer 110 is also reduced.

First magnetic stud 24 is extended to be more proximate medium confronting surface 42 than second magnetic stud 26 to provide a larger feature to receive stray fields from outside sources. Half-turns of conductive coil 20 are offset with respect to each other relative to the longitudinal dimension of write pole 12 to adjust the flux profile in write pole 12. Conductive coil portion 20a is positioned between yoke 30 and medium confronting surface 42 to maximize the net field strength at magnetic medium 40. Conductive coil portion 20a has a cross-section smaller than the remainder of conductive coil 20 and larger than conductor 14 to provide a controllable field from conductive coil portion 20a at magnetic medium 40.

Figure 8:
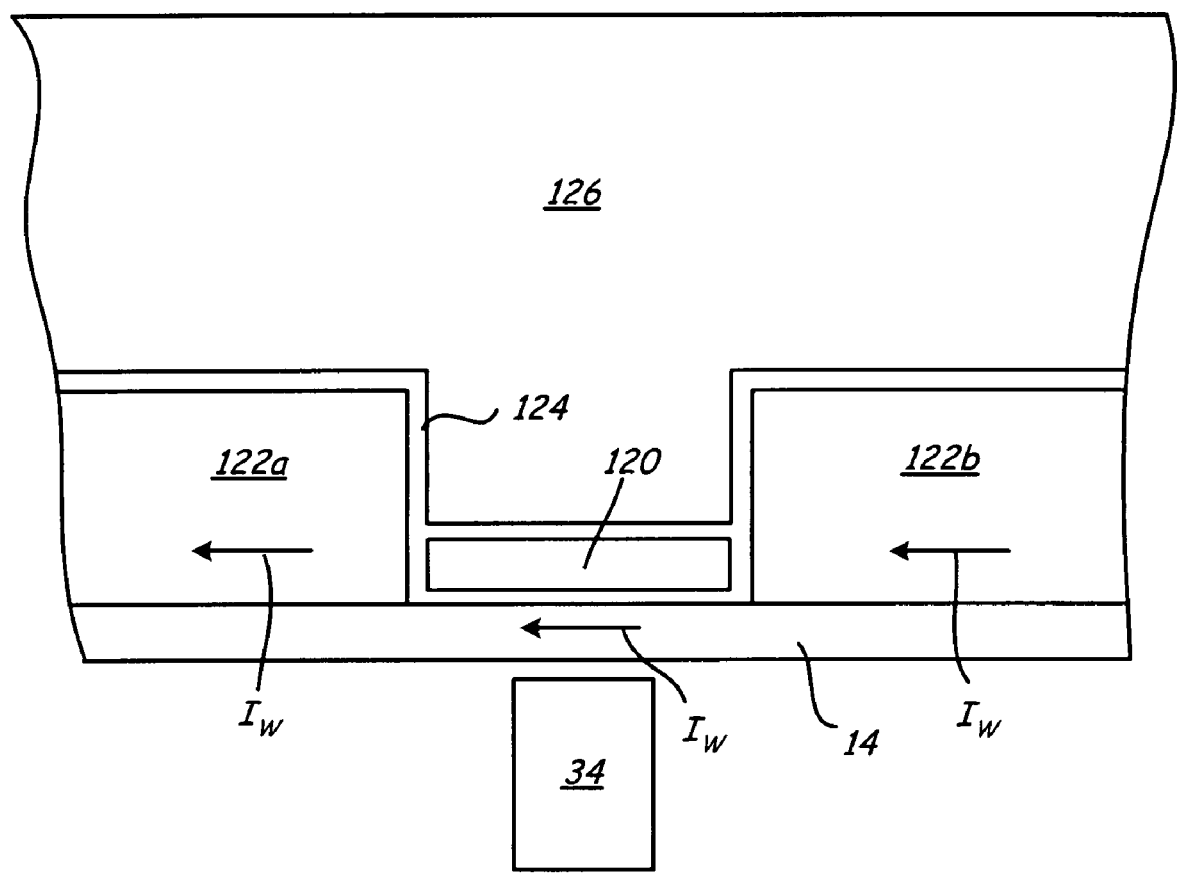
FIG. 8 is a medium confronting surface view of the conductor proximate the trailing side of the write pole tip and including a cladding layer.

FIG. 8 is a medium confronting surface view of conductor 14 including cladding layer 120 disposed on a side of conductor 14 opposite write pole tip 34. Conductor 14 is positioned along the medium confronting surface adjacent to the trailing edge of pole tip 34. Alternatively, conductor 14 may be disposed adjacent a leading edge of pole tip 34 (such as is shown in FIG. 1), with cladding layer 120 on a side opposite write pole tip 34. First electrical contact 122a and second electrical contact 122b overlay portions of conductor 14 that extend beyond the edges of pole tip 34. The overlaid surfaces of electrical contacts 122a and 122b are very much larger than cross-section of conductor 14. In an alternative embodiment, first electrical contact 122a is electrically connected to one end of conductor 14 and second electrical contact 122b is electrically connected to an opposite end of conductor 14. Electrical contacts 122a and 122b are coupled to a current source (not shown), which provides a wire current $I_w$ that flows through electrical contacts 122a and 122b and conductor 14. Heat sink 126, which is separated from cladding layer 120 and electrical contacts 122a and 122b by insulating material 124, may be provided to allow for heat transfer across insulating material 124.

Current $I_w$ generates the write assist field around conductor 14. The direction of current $I_w$ determines the direction of the write assist field that is generated around conductor 14 pursuant to the right-hand rule. In order to provide a magnetic field that augments the write field produced by write pole tip 34, current $I_w$ is directed to generate a write assist field that has the same orientation as the write field. At high current densities through conductor 14, there is a large enough flux density generated in pole tip 34 such that the magnetization of write pole tip 34 is driven to near saturation, beyond which the additional field from conductor 14 augments the field from write pole tip 34. This results in magnetic field amplification at magnetic medium 40. In addition, the field profile from conductor 14 maps onto that of write pole tip 34 so as to yield improved field gradients. Furthermore, fields at the trailing edge of conductor 14 cancel stray fields from write pole tip 34, leading to a sharper down-track field profile. Conductor 14 and electrical contacts 122a and 122b are separated from write pole tip 34 and cladding layer 120 by a thin layer of insulating material 124 to provide electrical isolation of these components while maintaining them in close proximity to each other. In addition, cladding layer 120 is magnetically isolated from conductor 14.

Cladding layer 120 is comprised of a magnetic material and is provided on conductor 14 to focus the assist field from conductor 14 into a tighter radius, thereby improving the field gradient and the gradient decay of the magnetic writer. Cladding layer 120 may be incorporated into any of the magnetic writers described above to provide field gradient improvements. Cladding layer 120 serves to at least partially balance the field generated by conductor 14 on a side opposite write pole tip 34 with stray fields from write pole 12 (which have a direction opposite that of the local fields from conductor 14). The net field down-track from write pole tip 34 drops sharply due to the balanced fields to provide a high gradient. Cladding layer 120 may have a cross-track width (left to right in FIG. 8) less than that of conductor 14 to provide control of the magnetic field profile in the cross-track dimension. Cladding layer 120 may also have a cross-track width substantially equal to that of conductor 14 to maximize the net field from the magnetic writer. Furthermore, while cladding layer 120 is shown proximate one external surface of conductor 14, cladding layer 120 may alternatively be provided adjacent additional external surfaces of conductor 14.

The gradient and gradient decay improve with increased applied currents $I_w$. In some embodiments, the field from write pole tip 34 and the field from conductor 14 are controlled to provide a net field at cladding layer 120 of approximately zero. The field balance at cladding layer 120 is a function of the current through conductive coil 20, current $I_w$ through conductor 14, the dimensions of cladding layer 120, and the dimensions of write pole 12. A simulation model showed that this balance can be achieved for media coercivity ranges of between about 4,000 Oe and about 10,000 Oe with current densities of about $10^8$ A/cm$^2$ to about $5 \times 10^8$ A/cm$^2$.

Figure 9A:
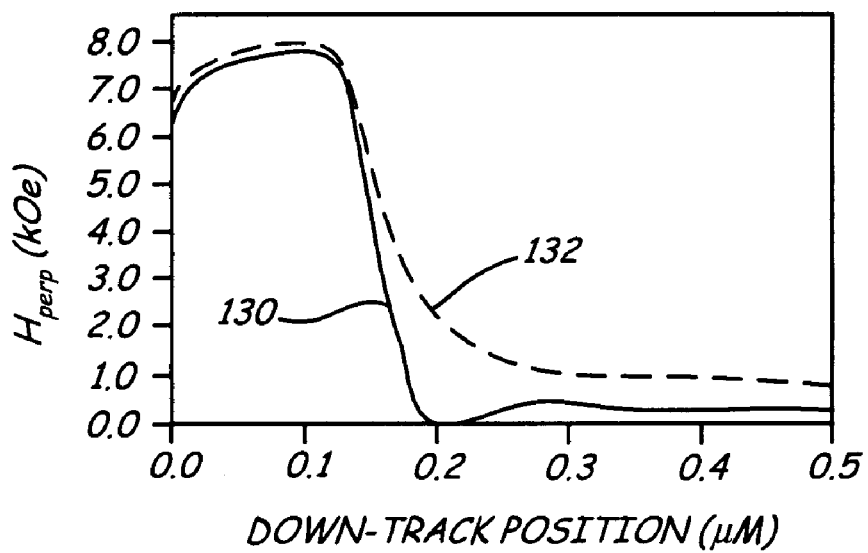
FIG. 9A is a graph showing the perpendicular field component of magnetic writers with a cladded write assist conductor and with an uncladded write assist conductor.

FIG. 9A is a graph showing the perpendicular field component $H_{perp}$ of a magnetic writer with conductor 14 including cladding layer 120 (line 130) and a magnetic writer with conductor 14 and no cladding layer 120 (line 132). Both writers tested also included a conductive coil 20 surrounding write pole 12 and were tested with optimum parameters for use with magnetic medium 40 having a coercivity of 5,000 Oe. Conductive coil 20 carried a 60 mA current, and conductor 14, which had a cross-track length of 200 nm and a down-track width of 50 nm, was driven by a 15 mA current. The perpendicular magnetic fields at the leading edge of write pole tip 34 is plotted at down-track position 0.0 µm, with down-track positions in the positive direction moving toward the trailing edge of write pole tip 34. Cladding layer 120 is located at down-track position of about 0.2 µm for line 130. As is shown, cladding layer 120 provides a sharp drop in the perpendicular field $H_{perp}$ down track from write pole tip 34. In the device tested for line 130, the current through conductive coil 20, the current through conductor 14, the dimensions of cladding layer 120, and the dimensions of write pole 12 were such that the net magnetic field at cladding layer 120 was approximately zero.

Figure 9B:
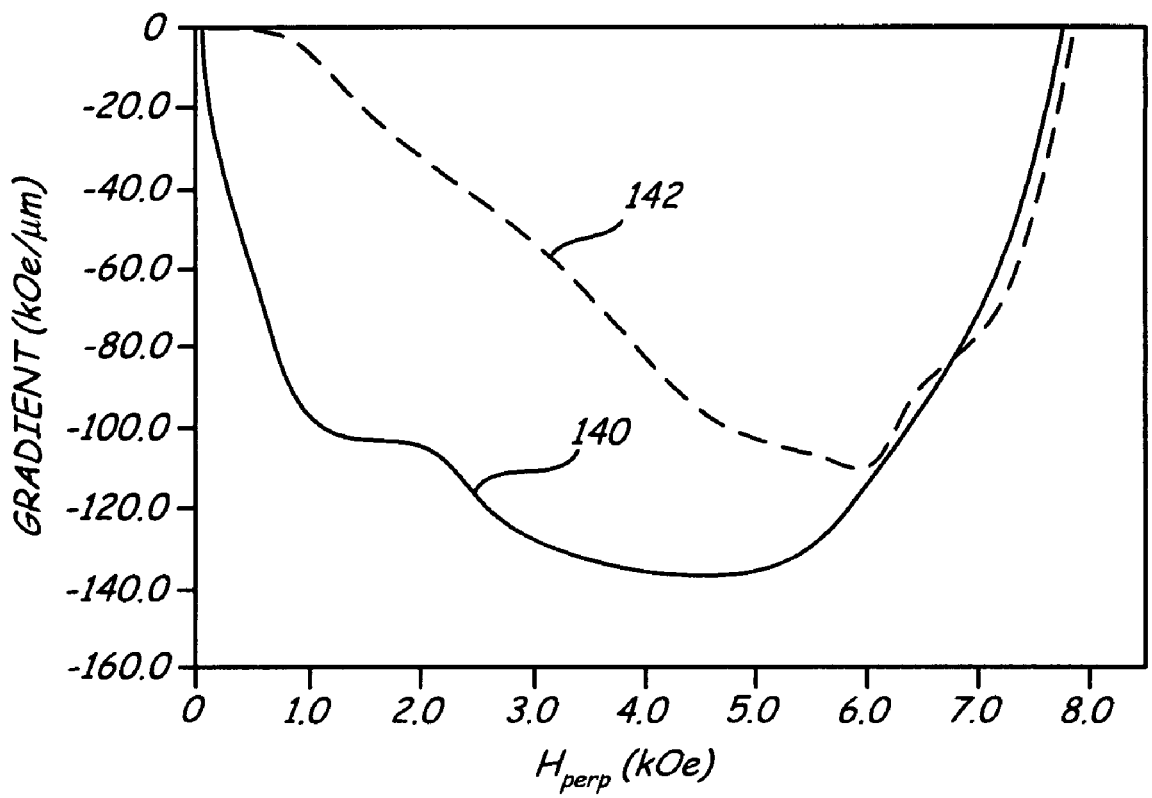
FIG. 9B is a graph showing the field gradient of magnetic writers with a cladded write assist conductor and with an uncladded write assist conductor.

FIG. 9B is a graph showing the gradient of the magnetic writer with conductor 14 including cladding layer 120 (line 140) and the magnetic writer with conductor 14 and no cladding layer 120 (line 142). The gradient of each magnetic writer tested is plotted versus the perpendicular field $H_{perp}$. As is shown, the field gradient for a magnetic writer including conductor 14 and cladding layer 120 (line 140) is greater and more uniformly distributed than the field gradient for a magnetic writer with conductor 14 and no cladding layer 120 (line 142).

In summary, the present invention relates to a magnetic device including a write element having a write element tip and a conductor adjacent an edge of the write element tip for carrying current to generate an assist field that augments a write field generated by the write element. A cladding material is disposed on at least one surface of the conductor. The cladding layer focuses the assist field from the conductor into a tighter radius, thereby improving the field gradient and the gradient decay of the magnetic writer.

Although the present invention has been described with reference to preferred embodiments, workers skilled in the art will recognize that changes may be made in form and detail without departing from the spirit and scope of the invention.

The invention claimed is:

1. A magnetic device comprising:
    a write element including a write element tip; and
    a conductor adjacent an edge of the write element tip for carrying current to generate an assist field that augments a write field generated by the write element, wherein a cladding material is disposed on at least one surface of the conductor.

2. The magnetic device of claim 1, wherein the cladding material is disposed on a side of the conductor opposite the write element tip.

3. The magnetic device of claim 1, and further comprising:
    a conductive coil for carrying a current to induce the write field in the write element.

4. The magnetic device of claim 3, wherein the current carried by the conductor and the current carried by the conductive coil cause a net field at the cladding material to be approximately zero.

5. The magnetic device of claim 1, and further comprising:
    a return element magnetically coupled to the write element.

6. The magnetic device of claim 5, and further comprising:
    a shield extending from the return element toward the write element tip.

7. The magnetic device of claim 1, wherein the cladding material is comprised of a magnetic material.

8. The magnetic device of claim 1, wherein the cladding material is magnetically isolated from the write element.

9. The magnetic device of claim 1, wherein a cross-track width of the cladding material is different from a cross-track width of the conductor.

10. A magnetic writer comprising:
    a write element that generates a write field at a front surface;
    a return element magnetically coupled to the write element on a trailing side of the write element;
    a conductor adjacent an edge of the write element at the front surface for carrying current to generate an assist field that augments the write field; and
    a cladding on at least one surface of the conductor.

11. The magnetic writer of claim 10, wherein the cladding is on a side of the conductor opposite the write element.

12. The magnetic writer of claim 11, and further comprising:
    a conductive coil for carrying a current to induce the write field at the front surface.

13. The magnetic writer of claim 12, wherein the current carried by the conductor and the current carried by the conductive coil cause a net field at the cladding to be approximately zero.

14. The magnetic writer of claim 11, and further comprising:
    a shield extending from the return element toward the write element tip.

15. The magnetic writer of claim 11, wherein the cladding is comprised of a magnetic material.

16. The magnetic writer of claim 11, wherein the cladding is magnetically isolated from the write element.

17. The magnetic writer of claim 11, wherein a cross-track width of the cladding material is different from a cross-track width of the conductor.

* * * * *